United States Patent [19]

Thompson

[11] 4,229,810
[45] Oct. 21, 1980

[54] SEISMOGRAM DISPLAY AND METHOD

[76] Inventor: Jay F. Thompson, 1211 Walnut La., Humble, Tex. 77338

[21] Appl. No.: 946,902

[22] Filed: Sep. 28, 1978

[51] Int. Cl.³ .............................................. G01V 1/34
[52] U.S. Cl. ..................................... 367/68; 367/71; 346/33 C; 346/107 SC
[58] Field of Search ............. 340/15.5 DS; 346/33 C, 346/107 SC, 110 R; 367/68, 70, 71

[56] References Cited

U.S. PATENT DOCUMENTS

| | | | |
|---|---|---|---|
| 2,946,643 | 7/1960 | Hutchison et al. | 340/15.5 DS |
| 3,173,743 | 3/1965 | Weissensteiner | 340/15.5 DS |
| 3,611,406 | 10/1971 | Hughes | 340/15.5 DS |
| 3,704,450 | 11/1972 | Smith | 340/15.5 DP |

Primary Examiner—Howard A. Birmiel
Attorney, Agent, or Firm—Michael P. Breston

[57] ABSTRACT

A novel seismogram display and method for making same are provided wherein a portion of the areas under certain ones of the positive and negative wavelet lobes of each seismic trace is shaded. Each shaded area originates at or near a null point. The novel seismogram allows an interpreter to correlate both partially shaded lobes per wavelet, instead of one completely shaded, single lobe per wavelet. The invention therefore greatly simplifies and enhances the correlation and interpretation process.

12 Claims, 12 Drawing Figures

SEISMOGRAM DISPLAY AND METHOD

BACKGROUND OF THE INVENTION (a) Field of the Invention

This invention broadly relates to novel seismograms or sections for use in seismic prospecting. More particularly, it relates to variable-area seismograms and to specific combinations thereof to produce a single seismic section—especially for the purpose of correlating, interpreting, or otherwise translating data on the seismograms to more easily derive useful information therefrom. The novel sections are especially intended for presenting seismic data in a form more suitable for analysis by an interpreter of such data.

(b) Prior Art

The general method of geophysical exploration utilizing seismic waves in the earth is well known. Briefly stated, this method comprises the steps of initiating a seismic impulse at or near the surface of the earth, and recording signals subsequently detected by geophones as a result of the earth's movements at one or more points suitably spaced from the point of origin of the seismic impulse. The original impulse will set up elastic waves that are transmitted through the earth. The signal recordation must permit measurement of the time elapsing between the start of the impulse and the generation of signals as a result of the subsequent earth movements. Any discontinuity or variation of structure within the earth will reflect and/or refract a portion of the energy in the waves, so that a recording of the signals from the geophones will comprise a number of arriving waves, each derived from the original impulse, and each differing from the others in time of arrival, magnitude, and wave shape, or in all three.

The usual type of seismogram produced by the technique described above, comprises a plurality of 'line' traces, each trace consisting of a series of wavelets which vary in amplitude along a time axis from a common reference point which is the instant at which the impulse was initiated. Each reflected wavelet, in turn, consists of a positive and a negative lobe. Positive lobes are all portrayed on one side of the time or "null" axis, and negative lobes on the other side thereof. The points separating the positive and negative lobes are known as "null" points which lie on the null axis. Such line traces are recorded side-by-side, so that events produced thereon by reflections from a given discontinuity may be identified by the manner in which they align across the record. Manifestly, a multiplicity of line traces are required in order to distinguish between undesired noise occurrences and desired reflection events. Noise tends to produce random or discontinuous signals, whereas reflections from underlying strata tend to align on the seismogram as continuous signals.

Various seismic prospecting methods and instruments are employed to gather seismic data. Generally, the data from the seismic observations are recorded on a suitable recording medium which may be paper, film, magnetic tape, etc. Most observations, at the present time, are recorded in a digital format.

Each of these recording media is reproducible and will provide a seismogram, a record, or a section (these terms are used interchangeably herein) which are prepared and displayed as two-dimensional data graphs. The graph is a plot of a series of traces as a function of X and Y coordinates. The X or horizontal coordinate represents horizontal distance over the earth surface. The Y or vertical coordinate represents, alternatively, a time scale or a depth scale. The depth scale is calculated by determining approximate velocities which are converted to the depth scale by applying the simple formula: time multiplied by velocity equals depth.

A seismic section is commonly depicted as variations of black and white or, on occasion, as colored areas in vertical bands or traces. The section may consist of a few or several hundred such vertical traces. Each trace may represent seismic data from only one or from a plurality of seismic observations. The customary modes of display are known as variable area, variable density, or line.

Computer technology now permits a vast amount of seismic data to be manipulated expeditiously, and thus it is feasible to make various types of displays from the same raw data. The computer operations include: modifying the wavelet shapes; emphasizing certain portions of the seismic trace; attempting to suppress unwanted signals (noise); the ability to add the results of several trace recordings at one location, when the individual trace records are obtained from several different seismic impulse points (common depth point recordings); the ability to extract an approximation of the relative true amplitude events on the trace ("bright spot" technique); etc.

Inasmuch as the information of primary interest on a seismic section is concerned with the reflected events which are portrayed thereon, it is the general practice in the seismic art to use the records to determine the structural configuration (stratigraphy) and, if possible, the lithology of the sedimentary layers which lie below the earth's surface. Since a single 24-trace seismogram, a norm, may exhibit, more or less, 3000 separate and distinct events, it will be appreciated that a person interpreting seismograms is faced with the serious problem of selecting and evaluating significant information and discarding that which is insignificant. This procedure is extremely time consuming, expensive and tedious. The accuracy and interpretability of the information ultimately obtained is, to a great extent, controlled by the interpreter's knowledge, his experience, the quality of the raw data, the manner in which it has been processed, and by the presentation of the data in an understandable and interpretable form. It will also be appreciated that if the latter condition is not fulfilled, a full utilization and understanding of the data may not be achieved.

Primarily, a seismic section is used for the mapping of the subsurface structure. This involves identifying the same reflecting geologic horizon or horizons on one or on a series of sections (usually in the same general area and usually interconnecting), measuring the times from the earth's surface to this horizon, placing the times in their proper position on the map, and contouring the map. However, this seemingly simple procedure can become difficult because of lithologic and geometrical changes in the subsurface strata. Reflection continuity may be interrupted by faults, may terminate, may be effaced by noise, etc. Further, contiguous reflection signals from the same horizon may show differences in their amplitudes, frequencies, and shapes. Thus, in attempting to follow the same horizon, an interpreter frequently resorts to correlation. This is the process of comparing a series of wavelets on one trace with those on a non-adjacent trace, so as to be able to cross areas of discontinuity while still following the same reflection.

SUMMARY OF THE INVENTION

In accordance with a broad aspect of this invention, instead of shading either all the positive or all the negative lobes of a trace, only portions of the areas under certain ones of the positive and negative lobes of each seismic trace are shaded. Each shaded area originates at or near a null point. The null points provide common reference points for all shaded areas. Thus, the shaded areas allow an interpreter to observe and correlate two partially-shaded lobes per wavelet, each originating at or near a null point, instead of one completely-shaded, single lobe per wavelet. The novel seismogram of this invention greatly simplifies and enhances the correlation and interpretation process.

DETAILED DESCRIPTION OF THE INVENTION

Figure 2:
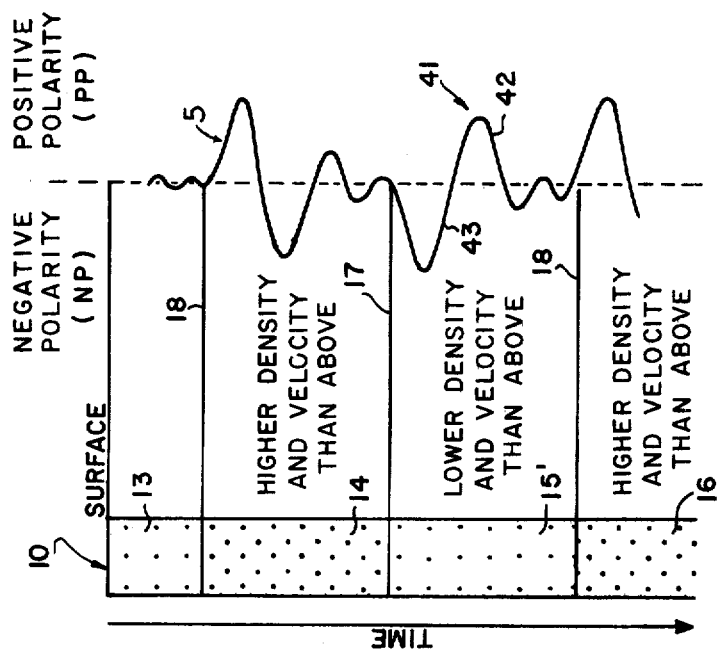
FIG. 2 is a seismic trace similar to FIG. 1 except that it is obtained from the earth wherein at least one intermediate earth layer has a relatively low density rock formation.
Figure 1:
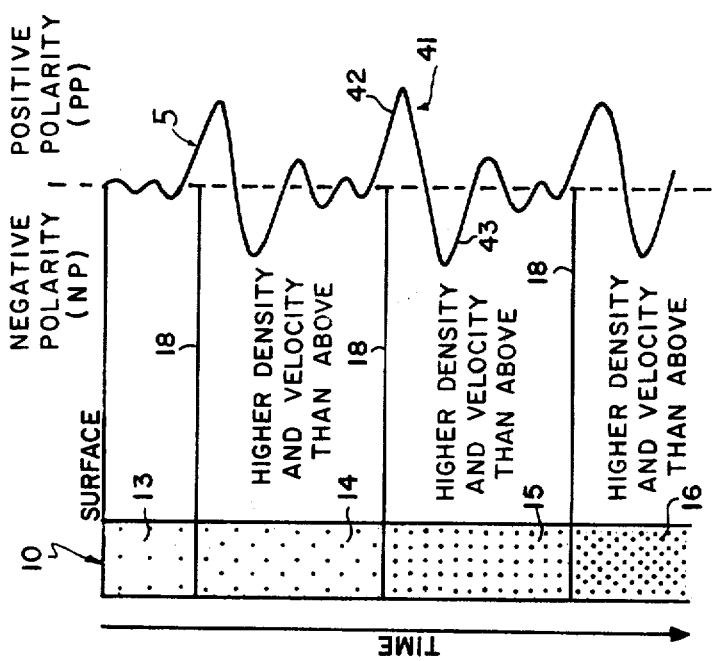
FIG. 1 shows a conventional single seismic trace representing a reflected seismic signal obtained from increasingly dense rock formations as a function of time or depth.

With reference to FIGS 1-2, the earth 10 is not homogeneous. The earth's strata 13–16 usually become more dense with depth, and the velocities of downward seismic signals within these strata tend to increase. These beds or strata have interfaces 18 which are the norm. On occasion, however, a less dense and lower velocity bed 15' (FIG. 2) intervenes in the layering of the geologic column. When a seismic signal encounters an interface 17 which separates such a pair of strata 14 and 15', a portion of the downward directed energy is reflected back to the earth surface in a very distinctive manner.

Figure 3:
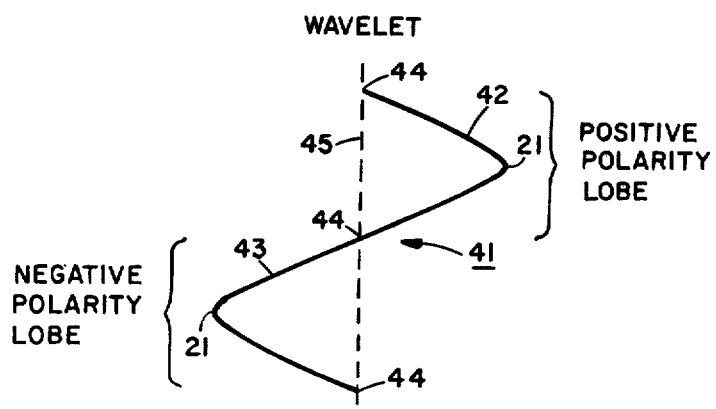
FIG. 3 shows an enlarged single wavelet taken from the line representation of FIG. 1.

When the seismic signal encounters a more dense stratum or bed than that through which it has been traveling, the reflected signal from such interface assumes a unique attitude which may be mathematically defined as a positive reflection coefficient (Rc). The reflected signal forms, and is recorded as, a trace 5 having a plurality of wavelets 41. FIGS. 1 and 3 show that the primary lobe 42 of wavelet 41 has a polarity which is positive. This positive polarity lobe 42 is followed by a negative polarity lobe 43 which is produced by the seismic detector itself as a compensatory "swing".

Conversely, if the seismic signal strikes an interface 17 which separates a less dense and lower velocity bed (FIG. 2), such as 15', than that through which it has been traveling, such as bed 14, (for instance, from high-density, high-velocity shale to low-density, low-velocity sand), the returning reflected signal will form, as the primary lobe of the wavelet 41, a negative polarity lobe 43, as a result of its negative reflection coefficient. This negative polarity lobe 43 will be followed by a compensatory positive polarity lobe 42 (FIG. 2) to complete the wavelet 41. The latter condition produces a wavelet which, when of large amplitude, is known as a "bright spot".

The formula for the reflection coefficient Rc is:

$$Rc = \frac{V_2 d_2 - V_1 d_1}{V_2 d_2 + V_1 d_1}$$

where, V is the velocity and d is the density; subscript 1 refers to the overlying bed, and subscript 2 refers to the underlying bed.

As stated above, each reflected wavelet 41 originates at an interface between beds. The interface's reflection coefficient will determine both the lobe's amplitude and polarity. Thus, a large reflection coefficient will effect a correspondingly large lobe, which may have either a positive or a negative polarity.

The relative amplitude or "bright spot" technique has become of increasing importance in petroleum exploration. The theory is based upon the fact that hydrocarbons are trapped in porous sediments, such as sand, and that seismic reflections emanating from these type sediments have a distinctive wavelet character: a large amplitude and a negative polarity.

The "bright spot" character may be enhanced, and thus better recognized, by subjecting the raw seismic data to special computer processing. Such processing attempts to show the relative amplitudes of the wavelets in relation to all others on the section. Processed correctly, the result shows a few large wavelet amplitudes and many small ones. The large amplitudes are the ones of main interest and appear as large lobes on the section.

A large lobe such as 43 in FIG. 2 resulting from a large negative reflection coefficient will indicate a subsurface stratum or bed of low density and low velocity and the possibility that it may contain a hydrocarbon deposit. On the other hand, large lobes, such as 42 in FIG. 1, resulting from large positive reflection coefficients will indicate a high-density, high-velocity stratum, the reflections from which are used primarily for structural mapping.

Thus an interpreter will attempt to distinguish between positive and negative lobes, to determine which have precedence, compare their respective amplitudes, and, finally, evaluate the significance of the predominant wavelets.

When "bright spot" wavelets are identified, the interpreter may make a calculation as to the possible thickness and, if sufficient information is available, the areal extent of the possible hydrocarbon bearing stratum. This technique involves an estimate of the internal velocity of the bed and, considering the character of the wavelets, his estimate as to the top and base of the bed. Measurements between these estimated points is made on the time scale, and is usually made from a null point to a null point, a wavelet crest to a wavelet crest, or any combination therebetween. The resultant time multiplied by the assumed velocity in the strata will give the approximate thickness of the bed.

In FIG. 3 is shown a single wavelet 41 having a positive polarity lobe 42 and a negative polarity lobe 43. The intersections between the positive and negative lobes are the null points 44, all lying on a null axis 45.

As previously mentioned, seismic traces can be represented in various kinds of graphs for displays, such as line graphs, variable-density graphs, variable-area graphs, etc. The representations of the traces in FIGS. 1-3 are line graphs.

At present, the variable-area seismic section (FIGS. 4, 7a, 7b) is the most commonly used. This type section was developed primarily for stratigraphic interpretation and evolved from line and density displays as a reasonable combination of the two. The variable-area display completely darkens all of the positive wavelet lobes 42 (FIG. 7a) or, alternatively, all of the negative wavelet lobes 43 (FIG. 7b) on each line graph or trace. The complementary lobes to the shaded lobes are depicted as unshaded lines.

The most visible and perceptible aspects of a variable-area seismogram are the shaded lobes. Using the variable-area traces in the correlation process, an interpreter is inclined and disposed to compare shaded lobes with other shaded lobes. The complementary lobes, shown as lines enclosing unshaded areas, are not ignored in the interpretation process, but the unshaded areas are more difficult to weigh one against another.

Figure 4:
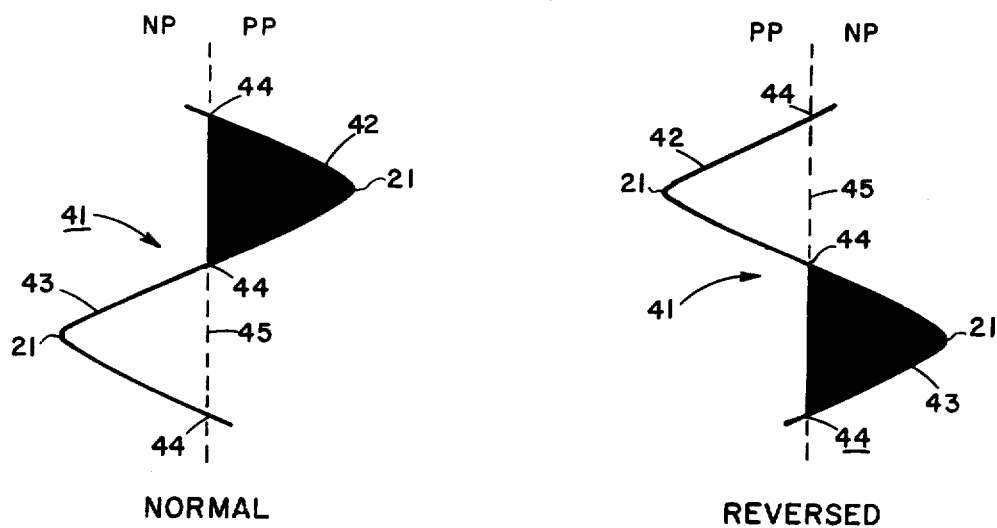
FIG. 4 shows a single wavelet in the conventional, variable-area representation with its positive lobe completely shaded, and a variable-area representation of reversed polarity, with the negative lobe completely shaded.

In FIG. 4 is shown a pair of wavelets 41 in the variable-area mode. The "normal" wavelet depicts a completely shaded positive lobe 42, and a completely unshaded negative lobe 43. The second wavelet is "reversed" in that the positive and negative lobes of the "normal" wavelet have been transposed to the opposite sides of the null axis 45. The negative lobe 43 is completely shaded and the positive lobe 42 is unshaded.

Because of a visual predisposition toward shaded lobes, an interpreter often considers it necessary to utilize two seismic sections when making a "bright spot" analysis—one section with the positive lobes shaded, and a second, reversed section with the negative lobes shaded. He uses data from both sections to compare and evaluate the wavelets.

In U.S. Pat. No. 3,173,743 is shown an apparatus for the representation of seismograms in various kinds of graphs from reproducible records.

Devices for the conversion of graphs from one mode of representation to a different mode of representation were originally based on optical-mechanical arrangements which are well known in the art. With the advent of digital seismic data processing, the conversions are produced more easily by programming a digital computer which drives a suitable plotter.

In accordance with the present invention, instead of fully shading either consecutive positive lobes or consecutive negative lobes, as shown in FIGS. 4a and 4b, only portions of the areas under at least the significant wavelets on both sides of the null axis are shaded, whereby each shaded area originates at or near a null point.

Thus, by allowing an interpreter to correlate two such partially shaded areas per wavelet instead of one, the novel seismogram simplifies and enhances the dependability of the correlation. Further, as such partially-shaded positive and negative lobes are in juxtaposition on each trace on the same section, visual comparisons and evaluations of the wavelets for statigraphic and lithologic interpretation are greatly simplified due to a large extent to the shaded areas originating at or near the null points.

Figure 5:
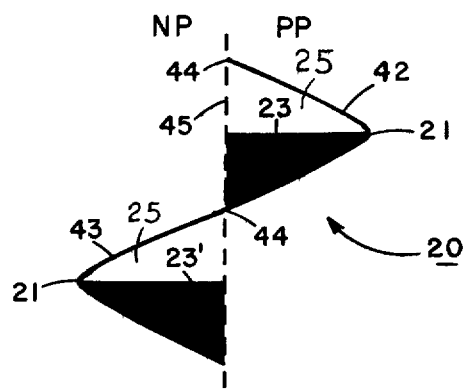
FIG. 5 shows a single wavelet in the novel mode of representation in accordance with the present invention.

In the embodiment of my novel display 20 shown in FIG. 5, one-half of the area under each positive lobe 42 and one-half of the area under each negative lobe 43 is shaded. Each shaded area originates at or near a null point. This can be accomplished by starting at the crest 21 of the positive lobe 42 of the wavelet 41 and darkening the area 23 under the lobe until the null point 44 is reached. This procedure is repeated for the next negative lobe 43 of the wavelet 41 by darkening the area 23' under the negative lobe 43, so that between consecutive shaded areas 23, 23' there is an unshaded area 25, and each shaded area 23 or 23' originates at or near a null point 44, so as to provide common reference and timing points for all shaded areas.

Figure 6A:
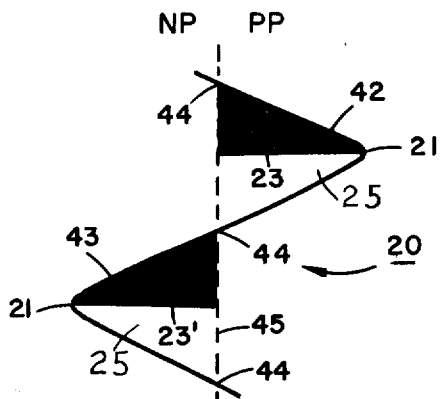
FIGS. 6a–6d show variant representations in accordance with the present invention.

In FIG. 6a each one of lobes 42, 43 is shaded starting from or near the null point 44 and continuing up to the crest 21 of the lobe, so that again the shaded areas 23, 23' of the lobes are separated by unshaded areas 25 of the lobes and each shaded area 23 or 23' originates at or near a null point 44.

Figure 6B:
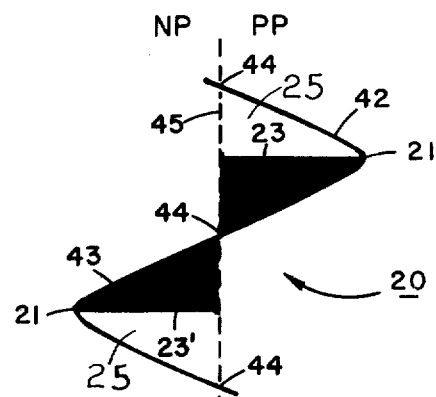

In FIG. 6b the shaded areas 23, 23' of the consecutive positive and negative lobes 42, 43 follow each other and have a common null point 44.

Figure 6C:
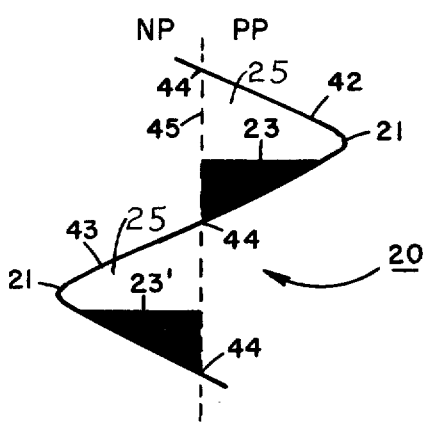

In FIG. 6c the shaded area 23, 23' instead of extending under one-half (50%) of each lobe, are made to extend under only about one-third (33%) of each lobe.

Figure 6D:
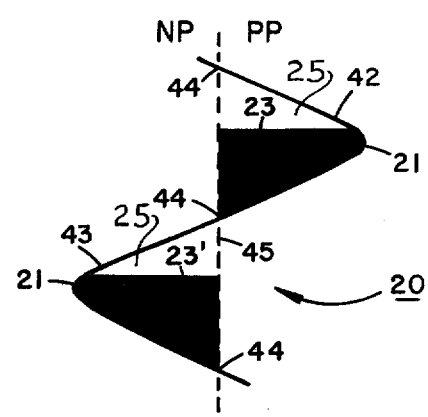

In FIG. 6d the shaded area 23, 23', instead of extending under one-half (50%) of each lobe, are made to extend under about two-thirds (70%) of each lobe.

It will be apparent that variants of the novel seismogram display are possible. However, for best results, the shading should not be less than 30% of the area under each lobe of the wavelet, and not be greater than 70%. Since in the preferred embodiment the shadings under the lobes originate at or near the null points 44 and extend to the crests of the lobes, the shadings align for best visibility and ease of interpretation. The 70% shadings under the lobes might be used for specialized processing, such as for "bright spot" processing, which is based on observing the largest lobes on the section. The 30% shadings might be applicable to high-frequency wavelets in order to improve their visibility.

Thus this invention is primarily concerned with variable area type sections which display characteristics that are properties of subterranean formations.

Figure 7A:
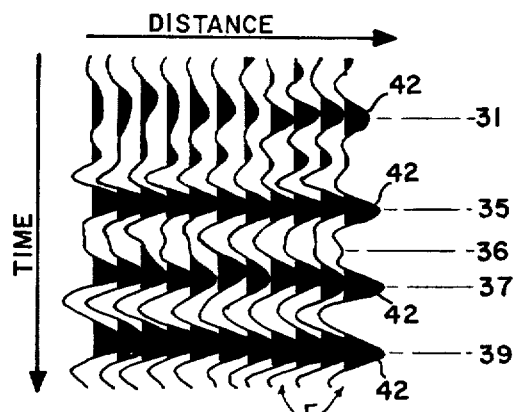
FIG. 7a shows a conventional, variable-area seismogram.
Figure 7B:
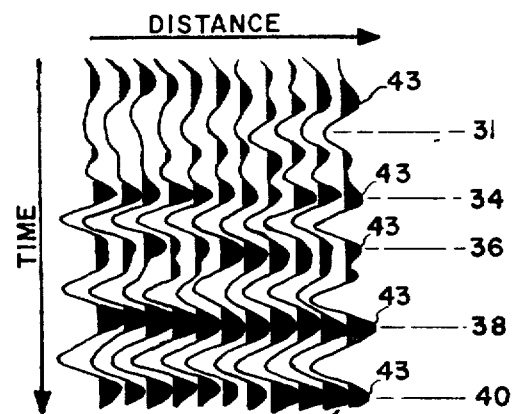
FIG. 7b shows a conventional, reversed-variable area seismogram.
Figure 7C:
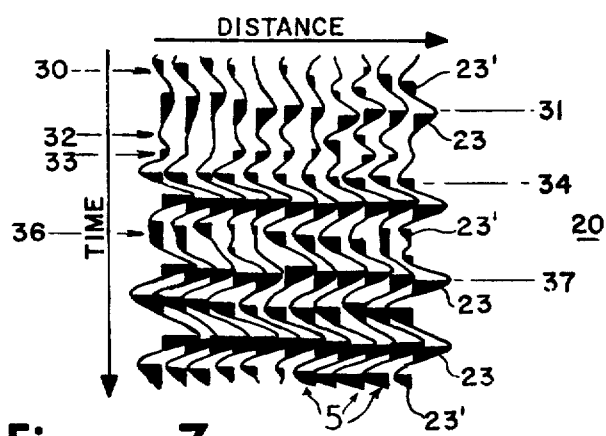
FIG. 7c shows a seismogram in accordance with the present invention.

The advantages of my novel display 20 will be further appreciated with references to FIGS. 7a-7c which respectively show three presentations of the same seismic traces. FIG. 7a is a conventional normal variable-area seismogram with the positive lobes 42 shaded; FIG. 7b is a conventional reversed variable-area section with the negative lobes 43 shaded; FIG. 7c is my novel section 20 in which lobe shadings extend from the lobe crests to the null points in accordance with the display mode shown in FIG. 5.

My seismogram 20 is particularly useful as a representation of data which is easier to interpret.

Wavelets having the same general frequency and amplitude and which persist from trace to trace horizontally on a seismic section are defined as a seismic horizon.

Reflecting horizons 31, 35, 37 and 39 are formed by the shaded lobes on FIG 7a. FIG. 7b also shows definitive shaded horizons 34, 38 and 40. Each of the reflecting horizons is followed easily when shaded. However, as an example, whereas horizon 31 is well defined by shading on FIG. 7a, its counterpart unshaded horizon 31 on FIG. 7b is less obvious. Conversely, the definition of the quiescent interval defined by shaded lobes 36 is more explicit on FIG 7b than the unshaded lobes 36 on FIG 7a.

However, as my novel section 20 (FIG. 7c) highlights each nuance of each lobe, the events at horizons 31 and 36, as well as all other positive and negative lobes, are emphasized and distinguished by discrete shadings and are easier to follow and interpret. The measurements made using section 20 are facilitated by having the shaded areas 23, 23' originate or terminate at or near the null points 44.

The principle of clarity and visibility also applies to correlation, which is the process of comparing a series of wavelets on a section with a non-adjacent series on the same section, or on a nearby section, in an attempt to establish similarity, and thus establish reflection continuity. Interpreters are inclined to correlate the most visible events which are the shaded lobes of FIGS. 7a and 7b. This propensity may be used to advantage with FIG. 7c, wherein two shaded areas per wavelet, each originating at or near a null point 44, may be used in the correlation process.

The present state of the seismic art does not permit the identification of rock types in the subsurface. However, the recently developed technique of Relative True Amplitude or "bright spot" above described will give an indication of density and velocity changes, which then may be related to the nature of certain types of rock material. This technique involves special processing of the seismic data and an analysis of the resultant wavelet characteristics. The amplitudes and positions of the positive and negative wavelet lobes are the determining factors in the analysis. If the primary reflected lobe of a stratigraphic sequence is large and has positive polarity, it may be presumed that the rock is more dense than the overlying sequence. If the primary lobe of the sequence is large and has negative polarity, the presumption is that the bed is less dense than the one above it. The latter condition is conducive to hydrocarbon accumulation.

For a "bright spot" analysis, amplitude comparisons between the positive and negative lobes on the variable area section (FIG. 7a)are difficult, as the interpreter is collating shaded and unshaded wavelet lobes. Thus it is common practice to print a second and reversed section, such as shown in FIG. 7b variable area reversed, and to examine them both to derive needed information. This information is immediately visible on my single novel section display 20 shown in FIG. 7c. The relative amplitudes of the positive and negative lobes are easily discerned by the shadings.

Although efforts are made to gather, process and print seismic data so that the positive and negative lobes are identified correctly on the trace, errors can be made and the presumed positions of the lobes may be transposed. However, as a preponderance of the reflected waves are positive, as indicated in FIG. 1, the discrete lobe shadings of my novel display may give, by visual inspection, an indication of the positive polarity position relative to the null axis. If most of the first or primary lobes in separate sequences of wavelets (defining stratigraphic interfaces) are seen on one side of the null axis, it is reasonable to assume that these are indicative of positive reflection coefficients and of positive polarities. The primary lobes on the other side, less in number, will indicate negative reflection coefficients, negative polarities and, possibly, porous sediments.

As an example, the first stratigraphical sequence lobes on the novel section 20 (FIG. 7c) are identified as horizons 31, 34 and 37. This determination is made by choosing the first meaningful lobe after the quiescent periods which are seen at 30, 32, 33 and 36. Further, an examination shows that the lobes which form horizons 31 and 37 are to the right of the null axis, whereas the lobes of horizon 34 are to the left. Thus, a preponderance of positive reflection coefficients, exemplified by the lobes of horizons 31 and 37, are to the right, and it may be assumed that the polarities shown in the examples of FIGS. 7a–7c are correct.

The measurement of the times or depths of significant reflections is critical to an accurate analysis for structural interpretations, bright spot analysis, etc. Time or depth scalings often are made on the Y axis to lobe crests. However, it is customary and necessary to space seismic traces quite close together so that they may be contained into workable sections. This practice frequently allows the larger shaded lobes of the conventional variable-area traces to overlap, and thus the crests of these lobes are obliterated. This effect may be seen on FIGS. 7a and 7b where measurements to lobe crests on horizons 35, 37, 39, 38, and 40 must be estimated.

On the other hand, all of the lobe shadings (FIG. 7c) on the novel section 20 are perpendicular to the crestal points and, thus, the time values will lie on the horizontal surface of the shaded areas. Measurements to these surfaces then will equate with the lobe crests.

If more than half of less than half of the areas under the lobes are shaded uniformly throughout the section, similar to the examples shown in FIGS. 6c and 6d, a constant time increment may be added or subtracted from the scaling so that the position of the crests may be recovered.

What is claimed is:

1. In a two-dimensional seismogram depicting at least one trace having amplitude variations representing the variations in the value of a property of rock layers beneath the earth's surface as a function of horizontal and vertical dimensions of the earth; said amplitudes varying in one dimension on both sides of a null axis extending in the other dimensions; said null axis intersecting said trace at null points; the portion of the trace between each pair of consecutive null points forming a lobe; and a pair of consecutive lobes forming a wavelet, characterized in that only portions of the areas under at least the significant wavelets on said trace, on both sides of the null axis, are shaded, and each shaded area originates substantially at a null point.

2. The seismogram of claim 1 wherein each shaded area is between 30% and 70% of the lobe's area.

3. The seismogram of claim 1 wherein each shaded area is substantially 50% of the lobe's area.

4. The seismogram of claim 1 wherein the shaded areas in consecutive lobes have a common null point.

5. The seismogram of claim 4 wherein each shaded area extends from said common null point to the crest of its lobe.

6. The seismogram of claim 2 wherein the shaded areas in consecutive lobes have a common null point.

7. The seismogram of claim 4 wherein each shaded area is substantially 50% of the lobe's area.

8. The seismogram of claim 2 wherein the shaded areas in consecutive lobes have a common null point and each shaded area extends from the common null point to the crest of its lobe.

9. The seismogram of claim 1 wherein the shaded areas in consecutive lobes have distinct and separate null points.

10. The seismogram of claim 9 wherein each shaded area is between 30% and 70% of the lobe's area.

11. The seismogram of claim 9 wherein each shaded area is substantially 50% of the lobe's area.

12. The seismogram of claim 9 wherein each shaded area extends from said null point to the crest of its lobe.

* * * * *